United States Patent
Ngan

(10) Patent No.: US 7,260,383 B1
(45) Date of Patent: Aug. 21, 2007

(54) METHOD AND SYSTEM FOR WIRELINE RESPONSE TO WIRELESS MESSAGE NOTIFICATION

(75) Inventor: John Ngan, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 167 days.

(21) Appl. No.: 10/783,158

(22) Filed: Feb. 20, 2004

(51) Int. Cl.
*H04L 12/58* (2006.01)

(52) U.S. Cl. ............... 455/412.1; 455/557; 455/566

(58) Field of Classification Search ............. 455/466, 455/412.1, 412.2, 552.1, 556.2, 557, 566
See application file for complete search history.

(56) References Cited

U.S. PATENT DOCUMENTS

| | | | |
|---|---|---|---|
| 6,259,892 B1* | 7/2001 | Helferich | 340/7.2 |
| 6,298,231 B1* | 10/2001 | Heinz | 455/413 |
| 7,031,437 B1* | 4/2006 | Parsons et al. | 379/88.12 |
| 2003/0095642 A1* | 5/2003 | Cloutier et al. | 379/88.13 |
| 2005/0064883 A1* | 3/2005 | Heck et al. | 455/466 |
| 2005/0124324 A1* | 6/2005 | Thomas et al. | 455/412.1 |
| 2005/0130631 A1* | 6/2005 | Maguire et al. | 455/414.1 |
| 2005/0136886 A1* | 6/2005 | Aarnio et al. | 455/404.2 |

OTHER PUBLICATIONS

"WAP™ MMS Architecture Overview, Version Apr. 25, 2001, Wireless Application Protocol Multimedia Messaging Service Architecture Overview Specification, WAP-205-MMSArchOverview-20010425-a."

"WAP™ MMS Client Transactions, Version Jan. 15, 2002, Wireless Application Protocol Multimedia Messaging Service Client Transaction Specification, WAP-206-MMSCTR-20020115-a."

"Wireless Application Protocol, MMS Encapsulation Protocol, Version Jan. 5, 2002, Wireless Application Protocol, WAP-209-MMSEncapsulation-20020102-a."

* cited by examiner

*Primary Examiner*—Temica Beamer

(57) ABSTRACT

A method and system are provided for serving multimedia messages to a cellular wireless communications device through an alternative route. According to an embodiment, the wireless device is locally coupled with a computer such as a PC. When a message notification arrives at the wireless device through a cellular air interface, the wireless device passes an indication of the notification to the local computer. The local computer then requests the message from a message server and the message delivered through a high-bandwidth wired pathway. Finally, the message is rendered for output at a terminal.

20 Claims, 13 Drawing Sheets

METHOD AND SYSTEM FOR WIRELINE RESPONSE TO WIRELESS MESSAGE NOTIFICATION

BACKGROUND

1. Field of the Invention

The present invention relates to electronic communication and more particularly to electronic messaging.

2. Description of Related Art

In certain wireless messaging systems, when a data message is to be sent to a wireless communication device (WCD), a network entity will send to the WCD a message-notification that carries a message key indicative of the data message. When the WCD receives the message-notification, the WCD then sends a data request (e.g., an HTTP GET request) to a message server, seeking to retrieve the data message indicated by the message key. The message server then responsively delivers the data message to the WCD.

In wireless communications systems, particularly cellular radiocommunication systems (such as CDMA, GSM or other such systems), the air interface over which these communications occur has limited bandwidth. Consequently, it is desirable to conserve use of the air interface.

SUMMARY

In accordance with the present invention, the messaging process described above will be modified so that when the WCD receives a message-notification via its air interface, a computer in local communication with the WCD will responsively retrieve the indicated message over a wireline network connection.

By way of example, consider the Multimedia-Messaging-System (MMS), which is an industry standard system that allows transmission of multimedia data content to a WCD. In accordance with industry standards, a sending entity transmits multimedia data in an MMS message destined for a particular target WCD. The MMS message may traverse a packet-data network such as the Internet and ultimately reach an MMS proxy server that serves the target WCD. Upon receipt, the MMS proxy server then stores the contained multimedia data in a data store under a message key and sends to the target WCD an MMS message-notification, which may take the form of a specially coded Short Message Service (SMS) message carrying the message key. The MMS message-notification thus passes over the WCD's air interface to the WCD.

In normal MMS operation, when the WCD receives the MMS message-notification, an MMS client application on the WCD would generate and transmit to the MMS proxy server a message-retrieval request such as an HTTP GET message, carrying the message key, seeking to retrieve the stored data message. The message-retrieval request would pass wirelessly over the WCD's air interface and via a radio access network to the MMS proxy server. In response, the MMS proxy server would then deliver the requested data message to the WCD. The data message would pass via the radio access network and via the WCD's air interface to the WCD. The WCD would then receive and render the data message for presentation to a user.

In accordance with an exemplary embodiment of the invention, once the WCD receives the MMS message-notification, the WCD will pass the MMS message-notification (or an indication thereof) to a computer with which the WCD is communicatively coupled. The computer will then send a message-retrieval request, such as an HTTP GET request, over a wired network connection to the MMS proxy server, seeking to retrieve the stored data message. And the MMS proxy server will responsively deliver the data message via the wired network connection to the computer. (Note that the wired network connection could include wireless portions, such as a wireless local area network (WLAN) link to a network router, for instance. The important point is that the computer's network connection does not include the WCD's cellular air interface.) Upon receipt of the data message, the computer may then render the data message for presentation to a user, or the computer may pass the data message to the WCD, which may then render the data message for presentation to a user.

The present invention thus enables wireline receipt of a data message in response to wireless notification of the message. Advantageously, the WCD's air interface will be used to carry the relatively light bandwidth message-notification (and perhaps an associated acknowledgement message). But the air interface will not be used to carry the relatively heavy bandwidth data message itself. Consequently, the invention helps to preserve air interface resources.

BRIEF DESCRIPTION OF THE DRAWINGS

FIG. 3(*b*) is a block diagram showing network architecture of an end-to-end connection at an embodiment.

FIG. 5(*b*) is a block diagram showing a LAN connection between a cellular wireless device and a computer.

FIG. 5(*c*) is a block diagram showing an infrared connection between a cellular wireless device and a computer.

FIG. 5(*d*) is a block diagram showing a radio-frequency connection between a cellular wireless device and a computer.

FIG. 5(*e*) is a block diagram showing a corporate wireless connection between a cellular wireless device and a computer.

FIG. 7(*b*) is a second flow chart depicting steps enabling receipt of a data message in response to wireless notification of the message.

DETAILED DESCRIPTION

1. Overview

Figure 1:
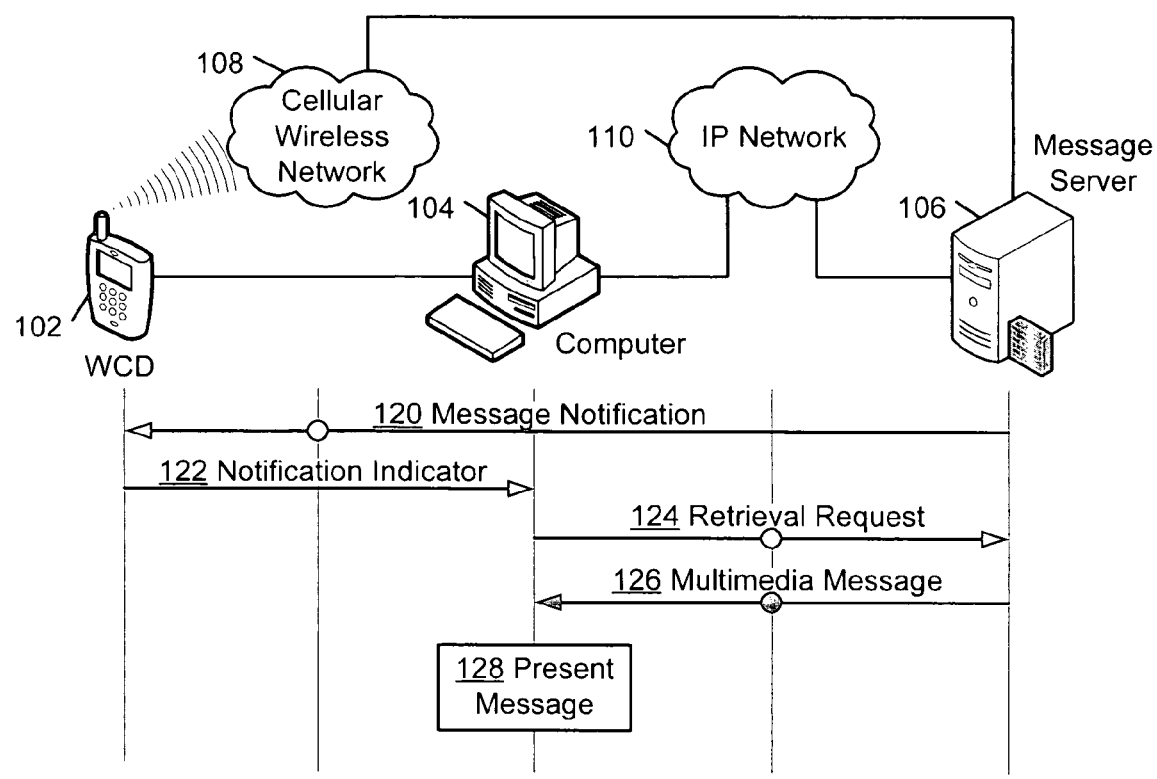
FIG. 1 is a flow diagram showing a signal sequence between elements of an embodiment.

Referring to the drawings, FIG. 1 generally depicts a signal sequence of a communications system in which various embodiments of the invention can be implemented. A wireless communications device 102 (WCD) is communicatively coupled to a computer 104 through a local connection such as a USB interface. The WCD 102 also has access to a cellular wireless network 108 through a radio-frequency air interface. A message server 106 has access to the WCD 102 through the cellular wireless network 108. Additionally, the message server 106 connects to the computer 104 through an Internet protocol (IP) network 110. Conventional equipment (not shown), such as a local area network (LAN) or wide area network (WAN), couples the message server 106 with the IP network 110 and the wireless network 108.

In certain cases, data bandwidth across the cellular wireless network 108 to the WCD 102 is less than data bandwidth across the IP network 110 to the computer 104. Thus, it may be advantageous to route an incoming multimedia message through the IP network 110 and the computer 104 rather than through the cellular wireless network 108. Additionally, it is advantageous to have a secondary delivery route.

The signal sequence of FIG. 1 begins when an incoming multimedia message arrives at the message server 106 and is stored temporarily. At step 120, the message server sends a message-notification to the WCD 102 through the cellular wireless network 108. The message-notification is a signal that is used to inform the WCD 102 that a message is available at the message server 106. Because the message-notification is not content-rich, it does not require a high bandwidth transmission path. Thus, the message-notification may be sent across the cellular wireless network 108 without creating bandwidth problems. According to an embodiment, the message-notification is sent as a Short Messaging Service (SMS) message and includes a message key identifying the multimedia message as well as a server address identifying an address of the message server.

After receiving the message-notification, the WCD 102 sends a notification-indicator to the computer 104 through the local connection at step 122. According to an embodiment, the notification-indicator is simply a copy of the message-notification. However, in another embodiment, the notification-indicator is composed of content from the message-notification as well as operational parameters At step 124, the computer sends a retrieval request to the message server 106 through the IP network 110. In response to the retrieval request, the message server 106 sends the temporarily stored multimedia message to the computer 104 through the IP network 110. Because it is expected that the multimedia message is content-rich, the high-bandwidth pathway through the IP network 110 is preferred to the lower bandwidth option through cellular wireless network 108.

In an embodiment, the multimedia message is rendered for presentation to a user once it is received by the computer 104. The presentation of the multimedia message at the computer 104 may take the form of any combination of text, graphics, photographic images, audio, speech, flashing lights and video, for example. Thus the multimedia message could be a sequenced set of photographs with accompanying music. According to an alternative embodiment, the multimedia message is sent from the computer 104 to the WCD 102 through the local connection rather being presented at the computer 104. In the alternative embodiment, the WCD 102 may render the multimedia message for presentation to a user. As with presentation on the computer 104, presentation on the WCD 102 may be a multimedia presentation using various presentation devices (such as those listed above).

2. Exemplary Architecture a. Network Architecture

Figure 2:
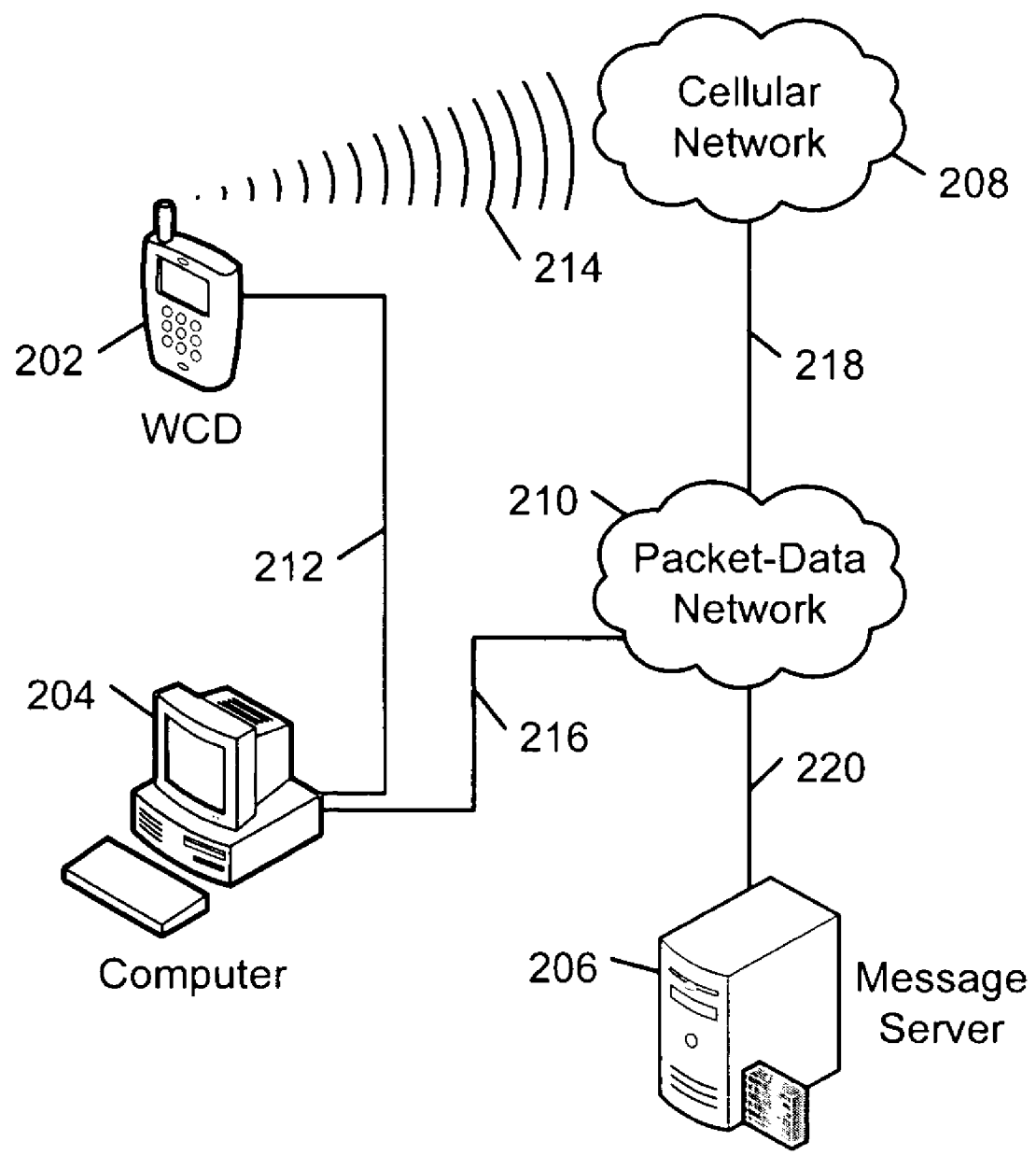
FIG. 2 is a block diagram showing network architecture of an embodiment.

FIG. 2 is a simplified block diagram of a communications system in which an embodiment can be implemented. A wireless communications device 202 (WCD) is connected to a computer 204 through a local connection 212. The computer 204 is also connected to a packet-data network 210 through a first data connection 216. Wireless signaling 214 represents communication between the WCD 202 and a cellular network 208 over a cellular wireless air interface. The cellular network 208 is connected to the packet-data network 210 through a second data connection 220. Finally, a message server 206 is connected to the packet-data network 210 through a third data connection 220.

Although signals are shown emitting from the WCD 202 in only one direction (toward the cellular network 208), this figure is not intended to indicate that the WCD 202 is necessarily equipped with a directional antenna. Additionally, the WCD 202 is designed to receive signals emitted from the cellular network 208 as well as send signals. Thus, the WCD 202 may be configured to operate as a cellular telephone or 2-way multimedia pager using a cellular wireless air interface such as code division multiple access (CDMA, also known as spread spectrum), time division multiple access (TDMA), frequency division multiple access (FDMA), or GSM. Accordingly, the cellular wireless air interface may be further configured with a packet-switched data protocol such as general packet radio service (GPRS) for enabling mobile data services. In the context of this application, cellular wireless air interface does not include the networking protocols of WiFi (802.11), Bluetooth or infrared (IR) communication. In an embodiment, the cellular network 208 includes a cellular station, such as a relay or transmitter, that communicates with the WCD 202 and provides an access channel through which system servers can communicate. In another embodiment, the cellular network 208 is a wireless network comprising a plurality of base stations. A base station may communicate directly with the WCD 202. Likewise, a base station may relay communication from the WCD 202 through the cellular network 208 to the packet-data network 210 and on to the message server 206.

The packet-data network 210 is preferably an internet protocol (IP) network and may include both secure and insecure sub-networks such as a corporate local area network (LAN) and the Internet respectively. As understood by those skilled in the art, the three data connections 216, 218, 220 may be directly wired to their endpoints or, more likely, may be coupled through intermediate wired or wireless networks. The same is true for any of the data connections depicted in the accompanying figures. According to a preferred embodiment, the first data connection 216 is an Ethernet connection that connects the local computer 204 to a router at the packet-data network 210. Likewise, the second and third data connections 218, 220 are preferably broadband connections for high-speed data transport.

b. Multimedia Messaging Service Architecture

Figure 3A:
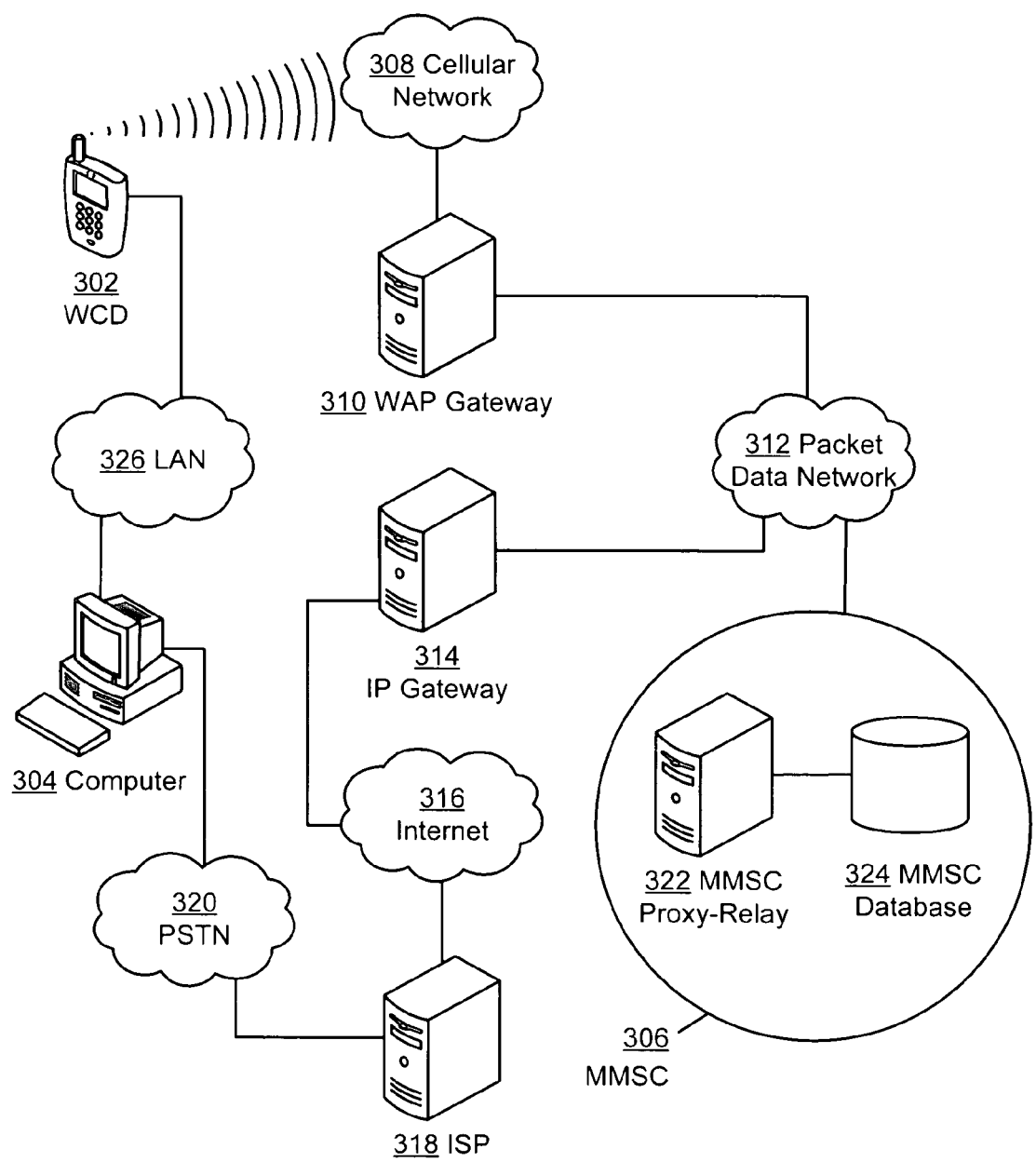
FIG. 3(*a*) is a block diagram showing network architecture of an embodiment having MMS functionality.

FIG. 3(a) shows an embodiment of a communications system architecture using multimedia messaging service (MMS). A WCD 302 is, for example, a third generation (3G) wireless phone enabled with MMS and is connected with a computer 304 (such as a PC) through a local area network 326 (LAN). The WCD 302 is also able to communicate with a WAP gateway server 310 through a cellular network 308 over an air-interface. The WAP gateway server 310 is connected with an MMS center 306 (MMSC) through a packet-data network 312. The MMSC 306 comprises both an MMSC proxy-relay 322 for providing access to various network messaging systems and an MMSC database 324 for storing MMS messages. MMS Proxy-relay 322 is also responsible for initiating a notification process to WCD 302. According to another embodiment, the MMSC 306 is considered a node of the packet-data network 312.

An IP Gateway 314 interconnects the packet-data network 312 with the Internet 316 and is useful for providing an access link between the MMSC 306 and entities connected to the Internet 316. The computer 304 is also connected to the Internet 316 through an internet service provider 318 (ISP). In the presently shown embodiment, the computer 304 is connected to the ISP 318 through a public switched telephone network 320 (PSTN). The PSTN connection 320 could represent, for example, a dialup connection or a DSL connection.

Thus two logically distinct data pathways are available for messages passing between the MSC 306 and the WCD 302. A wireless pathway passes from the MMSC 306 through the packet-data network 312 to the WAP gateway server 310 and from the WAP gateway server 310 through the cellular network 308 to the WCD 302. In parallel fashion, a wired pathway passes from the MMSC 306 through the packet-data network 312 to the IP Gateway 314, and from the IP gateway 314, the wired pathway passes through the Internet 316, ISP 318, PSTN connection 320, computer 304 and LAN 326 before eventually reaching the WCD 302.

In this embodiment, MMS is implemented over a wireless application protocol (WAP) service. WAP is a useful tool for accessing Internet or other HTTP content on a wireless device. A WAP gateway server retrieves information via HTTP from a server such as an MMS proxy-relay or from a web server. The WAP gateway server then encodes the HTTP data as wireless markup language (WML), and the WML-encoded data is sent to the wireless device. The content is then shown on the output of the wireless device. In general, the WML-encoded data is more compact and easier to transmit and display on a wireless device than is HTML.

The WAP wireless service protocol (WSP) is used as a transport mechanism in MMS. By using WAP WSP as a transport mechanism, any wireless device with WAP capabilities can be usedv—thus making MMS bearer independent rather than being limited to a proprietary protocol. In addition to its use with MMS, WAP can be used to transmit XML content to a wireless device.

An exemplary operation of the communications system shown in FIG. 3 is as follows. Preliminarily, a multimedia message (MMS message) that is addressed to the WCD 302 arrives at the MMSC 306. The MMSC database 324 temporarily stores the MMS message in data storage. The MMSC proxy-relay 322 then transmits an MMS notifier to the WCD 302 over the wireless pathway. Upon receipt of the MMS notifier, the WCD 302 sends a notification indicator to the computer 304 through the LAN 326. The computer 304 then sends an MMS message request (such as an HTTP Get) to the MMSC 306 over the wired pathway that passes through the ISP 318 and IP Gateway 314. The MMS message request is intended to prompt the MMSC 306 to deliver the MMS message to the requesting device. The MMSC 306 responds to the MMS message request by sending the MMS message to the computer 304 over the wired pathway. The MMS message can then be obtained by the user at the computer 304. Alternatively, the MMS message may be forwarded to the WCD 302 over the LAN 326 and obtained by the user at the WCD 302.

Multimedia content can be delivered to the WCD 302 through a number of formats including short messaging service (SMS), MMS, or an HTTP format for Internet communications such as WML or XML. With content in the form of XML, software on a WCD 302 is used to interpret the content and create an appropriate structured output. For example, graphing software stored on the WCD 302 may add newly received data (content) to a graph of stock market trends to be displayed on the output. According to a further embodiment, a multimedia message is delivered to the WCD 302 using one of SMS, MMS, or XML.

Multimedia content may take the form of any combination of text, image, slide show, sound, voice, video, vibration and any other output forms available on the wireless device. Examples of such content include photo messaging, weather reports with imagery, stock trend charts and animated news reports. The form of the content should be consistent with any subscription agreement between a user and carrier or value added service provider. Steaming content may also be appropriate where content is displayed on the WCD 302 or computer 304 as it is being downloaded.

c. Architecture Showing Sender and Receiver

Figure 3B:
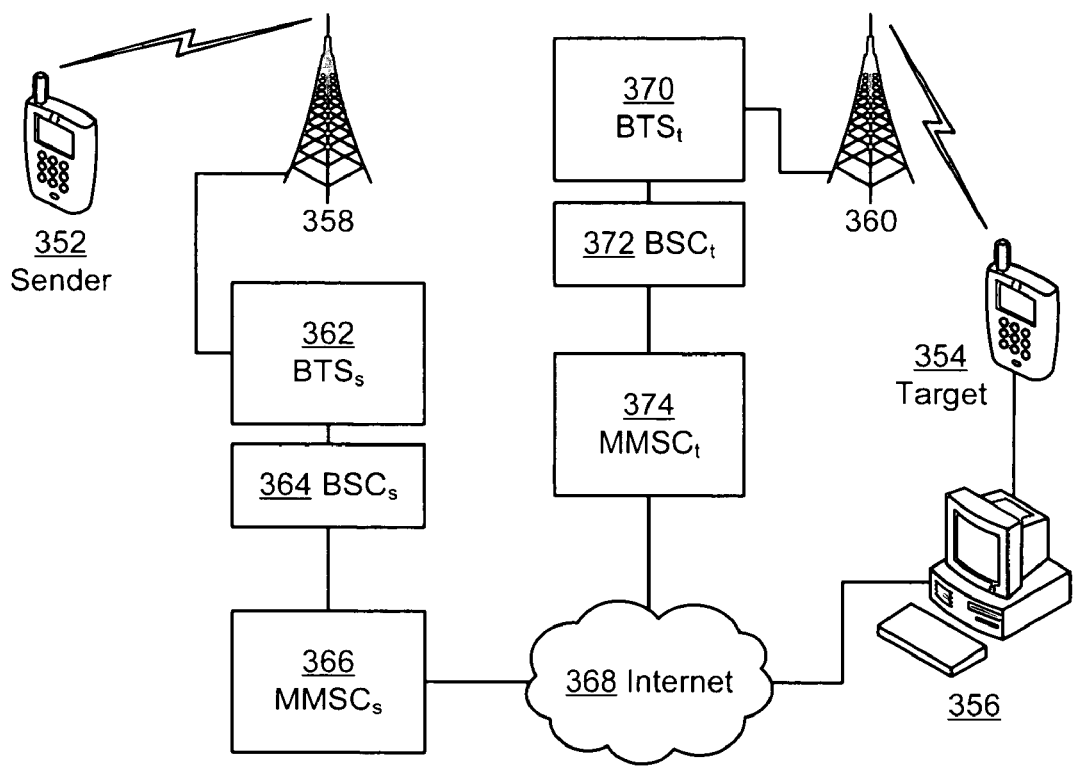

A multimedia message may be sent to a target wireless communications device (WCD) from various sources such as, for example, a second (sender) WCD, a personal computer, or a server. FIG. 3(b) provides a block diagram of another network architecture providing end-to-end communications functionality between a sender 352 and a target 354. As shown, the target 354 is a WCD and is coupled to a computer 356 through a local connection. The target 354 is also in communication with a first cellular tower 360 over a cellular wireless air interface such as CDMA. A target base transceiver receiver 370 ($BTS_t$) is connected with the first tower 360 and is used to transmit and receive radio frequency signals over the air interface. A target base station controller 372 ($BSC_t$) manages radio services for the BTS, 372. Coupled with the $BSC_t$ 372 is a target Multimedia Messaging Service Center 374 ($MMSC_t$) for handling messaging functionality. The coupling between the BSC, 372 and the MMSC, 374 may, for example, be through a packet-data network. As shown in FIG. 3(a), the $MMSC_t$ 374 may include an $MMSC_t$ proxy-relay and an $MMSC_t$ database. The $MMSC_t$ 374 is connected with the Internet 368. The computer 356 is also connected with the Internet 368 through, for example a router and a LAN.

On the side of the sender 352, a second cellular tower 358 is in communication with the sender 352. The second cellular tower 358 is coupled with a sender MMSC 366 ($MMSC_s$) through a sender BTS 362 ($BTS_s$) and a sender BSC 364 ($BSC_s$). Additionally, the coupling may pass through a packet-data network (not shown). The $MMSC_s$ 366 is also connected with the Internet 368. According to an alternative embodiment, the first cellular tower 360 is the second cellular tower 358—i.e. both the sender 352 and receiver 354 are served by the same cellular tower.

Another embodiment provides that both MMSC's 366, 374, both BSC's 364, 373, and the computer 356 are each communicatively coupled to a packet data network. Thus, a message between any two of the listed elements will pass through the packet-data network.

According to an embodiment, a messaging process between the sender 352 and the target 354 occurs as follows. The sender 352 activates an MMS client (operating as software at the sender 352). The sender 352 then enters an address for the target 354. The address may, for example, be the telephone number of the target 354. Further, the address may include an address type—such as "public land mobile network" or PLMN. Thus a resolved address may appear as "9131234567/TYPE=PLMN" where 9131234567 is the telephone number of the target 354 and TYPE=PLMN specifies that the target 354 belongs to a PLMN. Sprint's PCS network is an example of a PLMN. Alternatively, the address of the target 354 may be an IP address. In that case, TYPE=IPV4 or TYPE=IPV6, for example.

Additionally the sender 352 composes a multimedia message to be sent to the target 354. The multimedia message may, for example, be a photograph or other data file. Finally, the sender 352 requests that the multimedia message be sent.

Once the sender 352 requests that the multimedia message be sent, the MMS client on the sender 352 submits the message to its associated $MMSC_s$ 366 via the $BTS_s$ 362 and $BSC_s$ 364 that serve the sender 352. The message sent is configured with a header and payload ([Header][Payload]). The header includes source and destination information while the payload includes multimedia message content data. Other encoding schemes are available to those skilled in the art.

The proxy-relay at the $MMSC_s$ 366 resolves the address of the target 354 and routes-forward the multimedia message to the $MMSC_t$ 374 that is associated with the target 354. The forwarding of the multimedia occurs, for example, over a SMTP protocol network such as the Internet 368.

The multimedia message is stored at the $MMSC_t$ 374 in an MMSC database. The MMSC, then sends a notification message to the target 354 via the $BTS_t$ 370 and $BSC_t$ 372 that serve the target 354. Typically, the notification message is sent as a Short Message Service (SMS) message although it may be specially encoded. According to a preferred embodiment, the notification message includes an IP address, URL, or other network address of the $MMSC_t$ 374 or the MMSC proxy-relay located on the $MMSC_t$ 374. Additionally, the notification message includes a message key for obtaining the multimedia message from the $MMSC_t$ 374.

After receiving the notification, the target 354 retrieves the multimedia message from the $MMSC_t$ 374. In order to avoid a low data bandwidth across the cellular wireless air interface between the target 354 and the first tower 360, the retrieval of the multimedia message operates on a wired pathway through the computer 356 and the Internet 368. Thus, air interface capacity may be saved for user by other mobile users.

When not connected to the computer 356, the target 354 may request downloading of multimedia messages over the air interface. Alternatively, the target 354 may delay download until a local connection is established between the computer 356 and the target 354.

d. Architecture with Customer Premises Equipment

Figure 4:
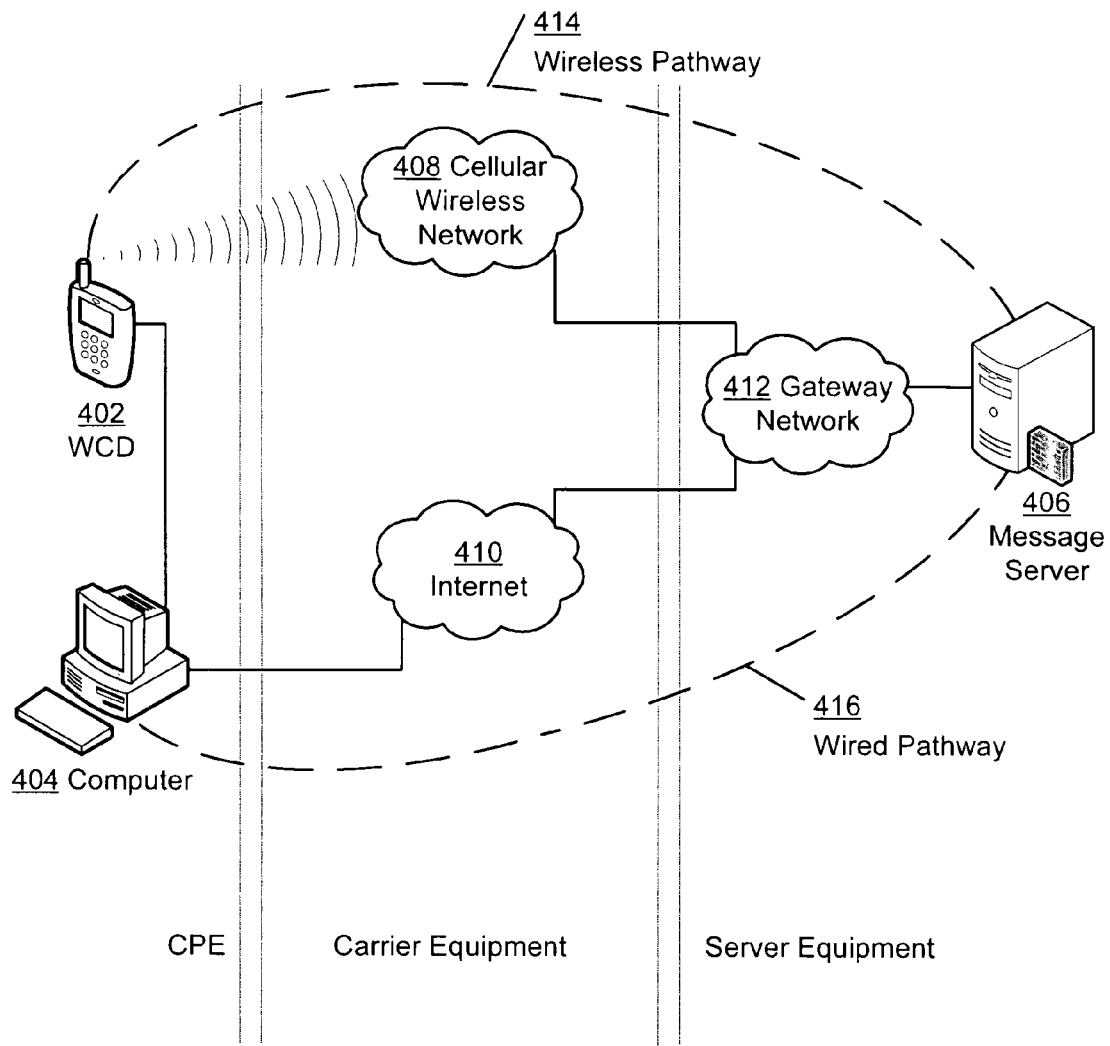
FIG. 4 is a block diagram showing a segmented network architecture of an embodiment.

Another network architecture configuration is shown in FIG. 4. In FIG. 4, network elements are categorized into three sets: customer premises equipment (CPE), carrier equipment, and server equipment. The set of CPE contains elements that would be located, for example, at the home of the customer or at an office. The two instances of CPE shown are a WCD 402 and a computer 404. The WCD 402 is locally connected with the computer, through, for example, a cable connected with a data port on the WCD 402 and a USB port on the computer 404. Server equipment includes a message server 406 and a gateway network 402. Carrier equipment includes a cellular wireless network 408 and the Internet 410. Logical data paths are shown following a wireless pathway 414 and a wired pathway 416.

According to an embodiment of the invention, because carrier equipment follows standard protocols, parameters of such equipment are not modified in the implementation of the embodiment. However, both CPE equipment is modified by the implementation of the embodiment. In the CPE for example, the WCD 402 is provided with a first message-client logic that is stored on the WCD 402 and executable by the WCD upon receipt of a message-notification via the wireless pathway. The message-notification indicates that an MMS message is stored on the message server 406. An effect of execution of the first logic is to pass to the computer 404 an indication of the message-notification. Additionally, the computer 404 is provided with a second message-client logic stored on the computer 404 and executable by the computer upon receipt of the indication of message-notification from the WCD 402. An effect of execution of the second logic is to send a message-retrieval request to the message server 406 via the wired pathway 416 and to receive a data message along the wired pathway 416 from the message server 406 in response to the message-retrieval request.

According to an embodiment, the first and second logic may be downloaded to the WCD 402 and computer 404 respectively through either the wireless pathway 414 or the wired pathway 416. Alternatively, CPE may be purchased with logic functionality already installed or the functionality may be installed by other means.

In a further embodiment, server equipment is provided with message-server logic for delivering a message-notification to the WCD 402 over the wireless pathway 414 and for delivering a requested message to the computer 404 over the wired pathway.

Communications within the system of FIG. 4 may be encrypted or protected by other security mechanisms. For example, at least one layer of security may be added to provide secure data transmission along the wireless pathway 414 and the wired pathway 416.

e. Local Connection between WCD and local Computer

Figure 5A:
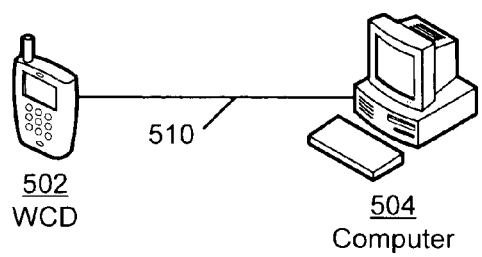
FIG. 5(*a*) is a block diagram showing a wireline connection between a cellular wireless device and a computer.

In FIG. 4, a local connection is shown between the WCD 402 and the computer 404. Embodiments of this data link are shown in FIGS. 5(a)-(e). FIG. 5(a) shows a WCD 502 connected with a computer 504 across a local wireline connection 510. The port may be connected, for example, by placing the WCD 502 in a cradle. The computer 504 may be attached to the local connection through, for example, a serial port, parallel port, USB port, or FireWire (i.e. an implementation of IEEE 1394 standard). Accordingly, DC power may be provided through the local connection 510 to recharge a battery of the WCD 502.

Figure 5B:
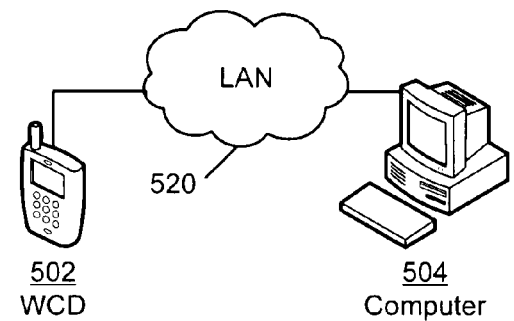
Figure 5C:
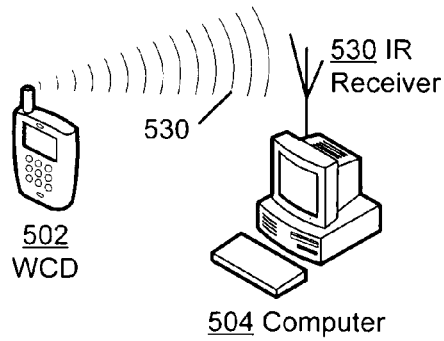

In FIG. 5(b), a local area network 520 (LAN) interconnects the WCD 502 and the computer 504. In this embodiment, the computer 504 may be located within the same corporate (or home) network as the WCD 502. In another embodiment, the local connection is a secure tunnel passing through an insecure network such as the Internet.

Although the local connection between the WCD 502 and the computer 504 is termed a "wired pathway," in the context of this of this application, the wired pathway can include wireless communications means so long as they do not pass through the cellular wireless network. For example, in FIG. 5(c), an infrared (IR) receiver 530 is attached to the computer 504. A local connection is formed between the WCD 502 and the computer 504 when the WCD 502 transmits an IR signal 530 that is received by the IR receiver 530. According to an embodiment, the computer is also equipped with an IR transmitter (not shown) to enable two-way communication.

Figure 5D:
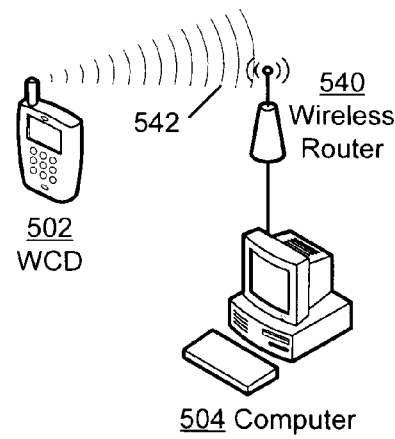

FIG. 5(d) shows another local connection between the WCD 502 and the computer 504 using a wireless connection. A wireless router 540 is configured to receive signals from and transmit signals to a wireless transceiver at the WCD 502. The wireless router may, for example be enabled to communicate using a wireless networking protocol such as WiFi (802.11) or Bluetooth. Other wireless networking protocols are available and are well known in the art.

Figure 5E:
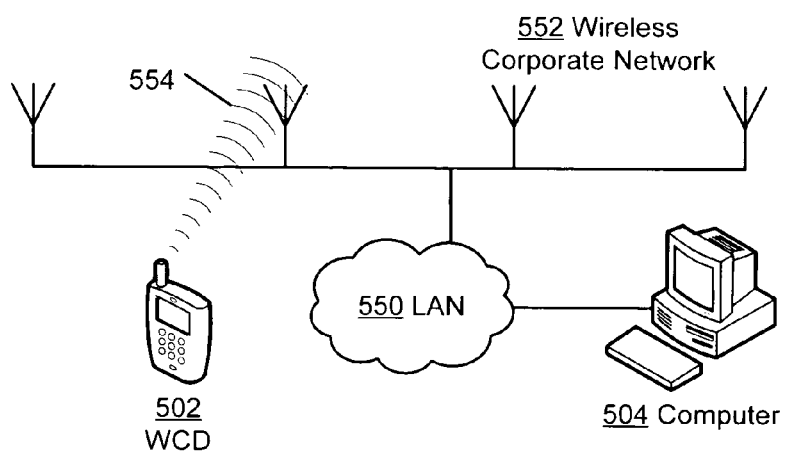

In FIG. 5(e), a wireless corporate network provides functionality for a data link between the WCD 502 and the computer 504. In operation, a message is transmitted from the WCD 554 over a WiFi air interface and received by an antenna of the corporate wireless network 552. The message is then sent through a LAN 550 to the computer.

According to another embodiment, a single device comprises both the WCD 502 and the computer 504. Thus, for example, a portable computer with both a cellular wireless modem and an Ethernet connection to a router may serve as the WCD/computer device.

3. Exemplary Wireless Communications Device

Figure 6:
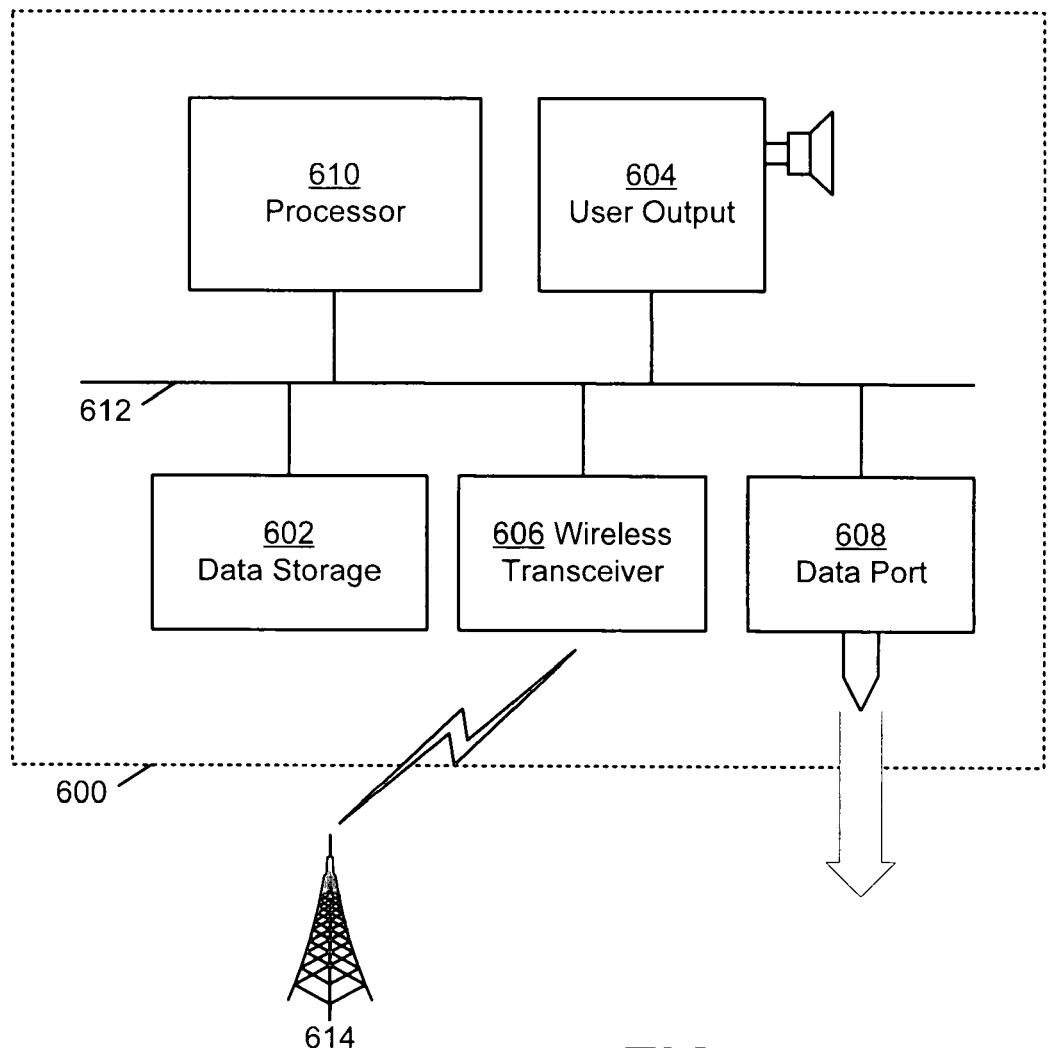
FIG. 6 is a block diagram of a wireless client device at which an embodiment can be employed.

FIG. 6 shows a simplified block diagram of a wireless communications device 600 (WCD). The WCD 600 is a device that is configured to communicate over a cellular wireless air interface. For example, WCD 600 may be, for example, a cellular telephone such as a Sprint PCS Vision$^{SM}$ handset, a wirelessly equipped personal digital assistant (PDA) phone, a cellular wireless equipped portable computer, etc.

As shown in the figure, a data bus 612 serves as a backbone of the WCD 600 by interconnecting the various elements. (Other types of busses may be used—e.g. loop). Rewritable data storage 602 can store data and executable instructions and is connected to a processor 610 through the bus 612. A user output 604 is also connected through the bus 612. A wireless transceiver receiver 606 is provided for wirelessly communicating with a cellular tower 614 over a cellular air interface. Additionally, a data port 608 is configured to communicate with an external device such as a PC through a wired connection such as a USB interface.

According to an embodiment, the rewritable data storage 602 is a non-volatile solid state device such as an EEPROM or Flash memory. The data storage 602 may be arranged in a directory structure where the processor 610 can access a file stored in data storage 602 by referring to a pointer to the file—such as its filename or hardware location. As will be understood by those skilled in the art, data storage functionality may take other forms. In a further embodiment, the data storage 602 holds a set of message-client logic that is executable by the processor. The WCD 600 is configured to execute the message-client logic upon receipt of a message-notification via the wireless transceiver 606. Upon execution of the message-client logic, an indication of the message-notification may be passed to a locally connected computer via the data port 608.

Multimedia messages are presented to the user at the user output 604. The user output 604 may include, for example, a display and a speaker and may be configured to incorporate a combination of voice, images, text, animation, graphics, lights such as LEDs, other sounds and vibration. The media combination presented for a particular message will depend upon the message configuration.

The wireless transceiver 606 is well known in the art and could be embodied by, for example, a PCS transceiver.

4. Exemplary Process a. Simplified Process Flow

Figure 7A:
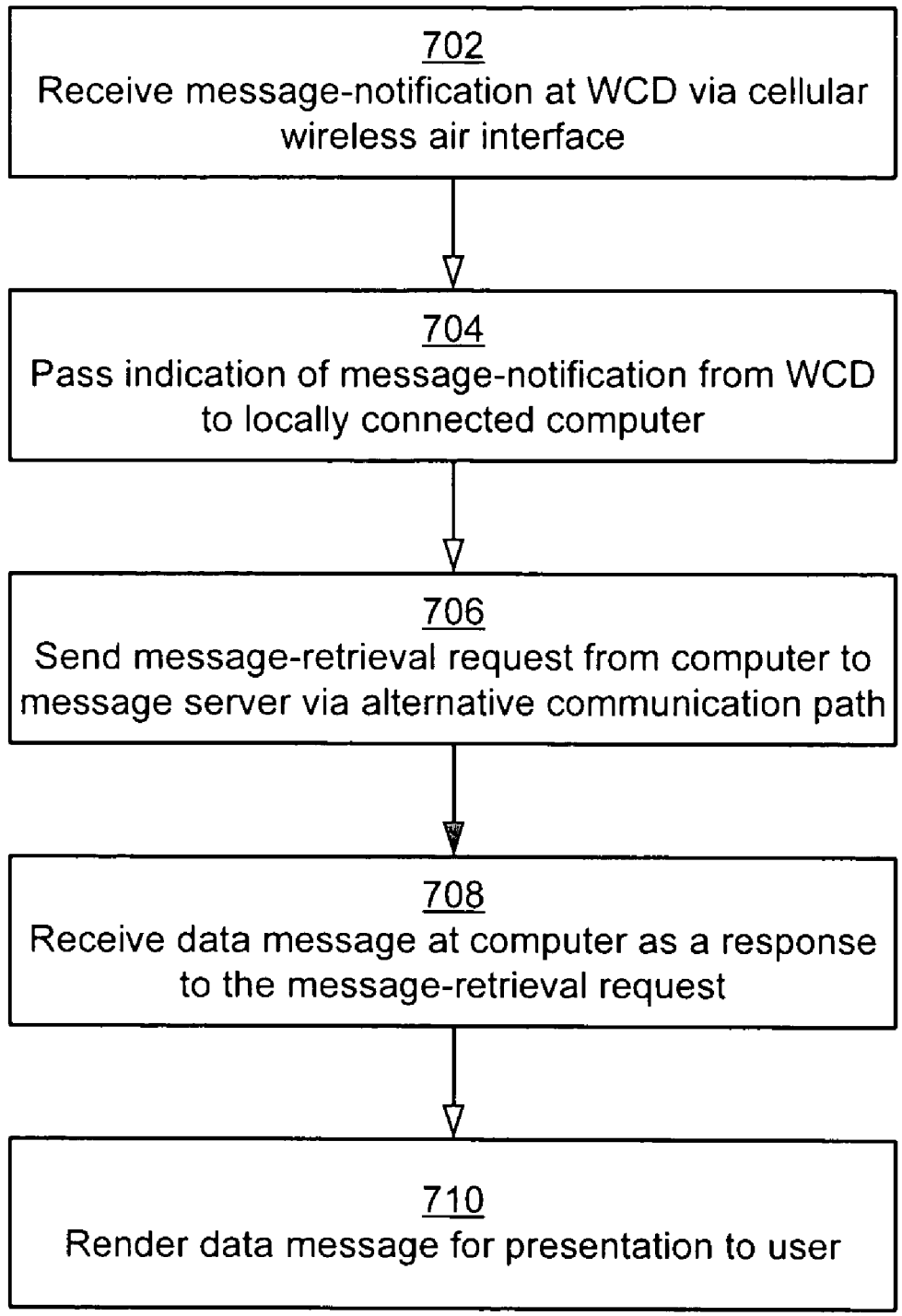
FIG. 7(*a*) is a flow chart depicting steps enabling receipt of a data message in response to wireless notification of the message.

FIG. 7(a) is a flow chart illustrating a process for receiving a multimedia message. At step 702, a message-notification is received at a WCD through a cellular wireless air interface such as CDMA air interface, TDMA air interface, or GSM air interface. The message-notification is intended to inform the WCD that a multimedia message—such as an MMS message—has been received by a message server. The message-notification may, for example be a coded Short Message Service (SMS) message. Generally, the message server will wait for a response to the message-notification before sending the multimedia message to the WCD.

At step 704, a message-indication is passed from the WCD to a locally connected computer such as a PC. The message-indication is intended to inform the computer that the WCD has received the message-notification. In an embodiment, the message-indication is simply a forwarded copy of the message-notification. Alternatively, the message-indication may include information regarding the message-notification as well as other information. The message-indication may further include, for example, parameters of the WCD, message delivery request parameters, password or other authentication information, security information such as a security key, timeout information, message location information, etc.

Passing the message-indication may be automatically triggered by receipt of the message-notification or may be triggered by other means. A user prompt, for example, may require a reply before triggering the step of passing the message-indication. In an embodiment, the user prompt requests that a user of the WCD make a determination as to whether the multimedia message will be delivered via a wireless pathway or a wired pathway. If the user selects the wired pathway, then the message-indication may be sent to the computer (because the computer is on the wired pathway).

At step 706, a message-retrieval request is sent from the computer to the message server via an alternative communication path. The alternative communication path is defined generally as a path that does not pass back through the WCD or use the same cellular wireless air interface assigned to the WCD. As shown in FIG. 4, the wired pathway 416 provides an alternative communication path to the wireless pathway 414.

At step 708, a data message (such as a multimedia message) is received at the computer in response to the message-retrieval request that was sent to the message server. According to an embodiment, the data message is sent from the message server after receiving the message-retrieval request. Additionally, the data message is preferably sent along the alternative communication path. Alternatively, the data message may be sent along a third communications pathway.

At step 710, the data message is rendered for presentation to the user. According to alternative embodiments, the presentation may take place at either the WCD or the local computer. In another embodiment, the user may determine the location of the presentation of the data message. The determination of location of presentation may be a preset preference stored on the WCD and local computer. Alternatively, the determination of location of presentation may be made upon receipt of the message-notification or upon receipt of the data message. In an implementation, a user prompt at the WCD requests that a user of the WCD make a determination of location of presentation.

The data message includes multimedia content. Such content may, for example, be selected from the group consisting of text, graphics, photographic image, audio, speech, and video.

Figure 7B:
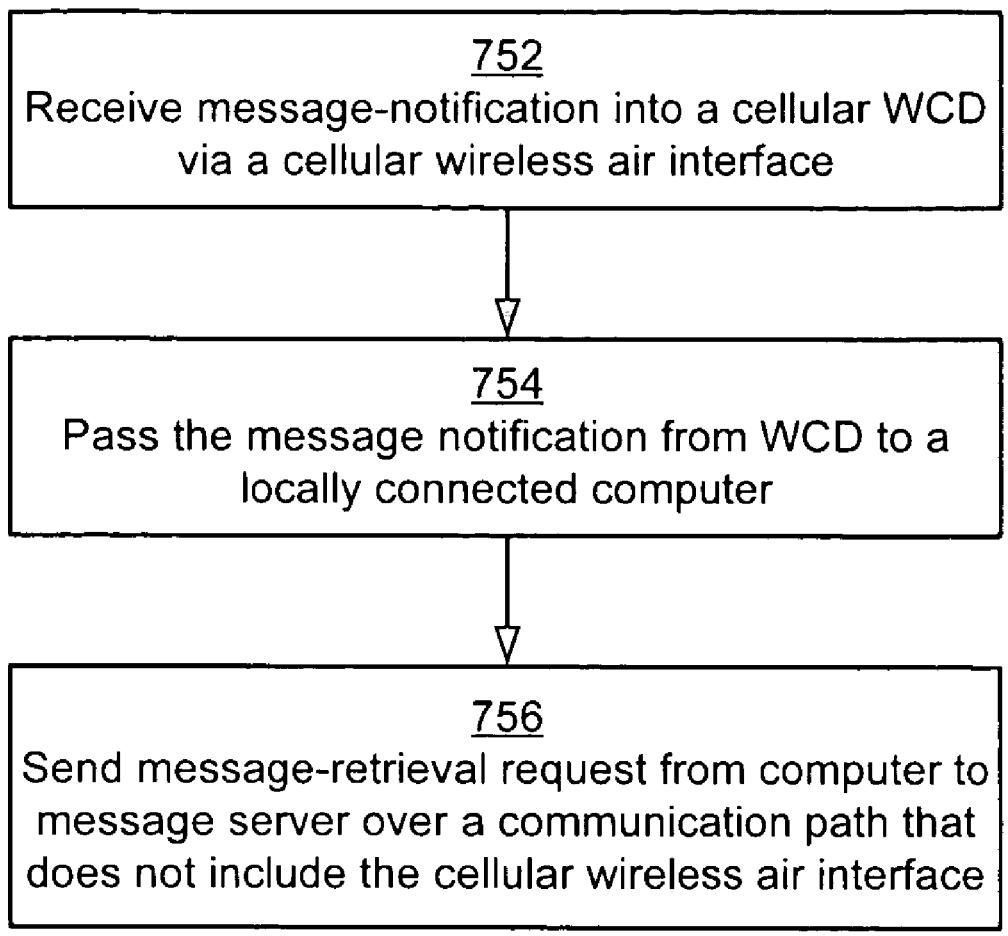

FIG. 7(b) provides a second process flow chart illustrating a method of receiving a multimedia message. At step 752, a message-notification is received into a cellular wireless communication device via a cellular wireless air interface. The message-notification is then passed from the wireless device to a locally connected computer at step 754. The computer, acting in response to the message-notification, sends a message-retrieval request to a message server over a communication path that does not include the cellular wireless air interface. The communication path may, for example, be over an Ethernet connection to an Internet Service Provider (ISP) and over a packet-switched network such as the Internet between the ISP and the message server.

b. Process Flow Showing MMS Signalling

Figure 8:
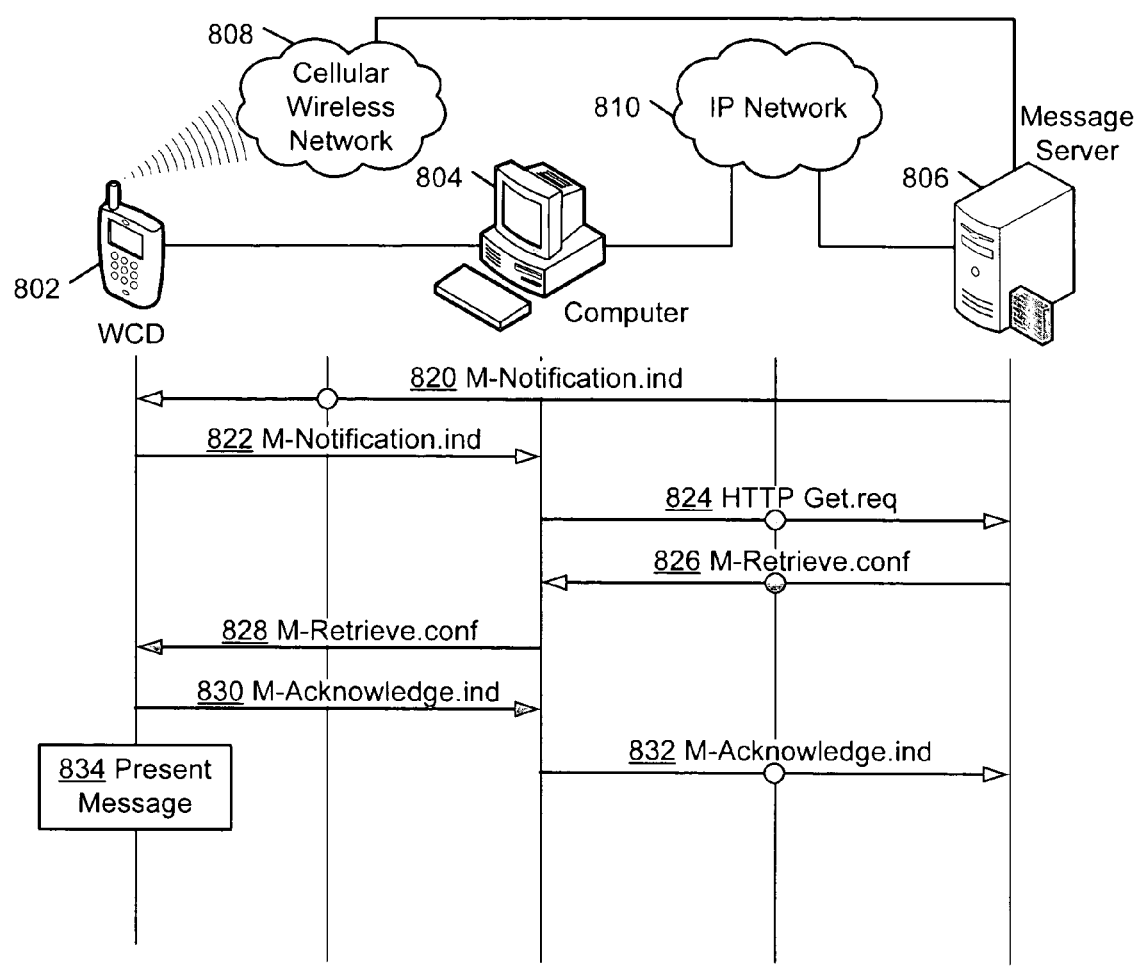
FIG. 8 is a flow diagram showing an MMS signal sequence between elements of an embodiment.

FIG. 8 is an illustration of a process flow for delivering a multimedia message to a user along a high-bandwidth pathway. FIG. 8 shows exemplary MMS signaling between elements of the embodiment. A wireless communications device 802 (WCD) may be, for example, a cellular telephone, a wirelessly equipped PDA (such as a TREO™ 300), or a mobile computer equipped with a cellular modem. The WCD 802 is connected to a local computer 804 such as a PC or corporate server. A message server 806 is configured to communicate with the WCD 802 across two separate pathways. A wireless pathway connects the message server 806 with the WCD 802 through a cellular wireless network 808 such as Sprint's PCS network. A wired pathway connects the message server 806 with the WCD 802 through an IP network 810 such as the Internet and through the local computer 804. According to the present embodiment, the message server 806 is an MMS message server that operates as an MMS server and an MMS proxy-relay.

The message server 806 first sends an M-Notification.ind to the WCD 802 over the cellular wireless network 808 at step 820. The M-Notification.ind serves as an indication that an MMS message is available at the message server 806. The M-Notification.ind preferably includes a message key that is used to identify the MMS message. Additionally, the message key may be useful for security authentication. At step 822, the WCD 802 sends the M-Notification.ind to the local computer 804, thus informing the local computer 804 that an MMS message addressed to the WCD 802 is available at the message server 806. The local computer 804 then posts an HTTP Get.req to the message server 806 at step 824. The HTTP Get.req is sent from the local computer 804 to the message server 806 through the IP network 810. A purpose of the HTTP Get.req to request that the MMS message be sent from the message server 806 to the local computer 804. According to a preferred embodiment, the HTTP Get.req carries the message key.

After receiving the HTTP Get.req, the message server 806 sends the MMS message to the local computer 804 over the IP network 810 along with an M-Retrieve.conf at step 826. The MMS message and M-Retrieve.conf are forwarded to the WCD 802 across the local connection at step 828. After receiving the M-Retrieve.conf, the WCD sends an acknowledgement in the form of an M-Acknowledge.ind through the local computer 804 to the message server 806 at steps 830 and 832 respectively. Additionally, the WCD 802 presents the message to a user output of the device at step 834. As will be understood by one skilled in the art, each step in the process may be configured for either automatic execution following a triggering event or for manual execution following a manual response to a user prompt.

Figure 9:
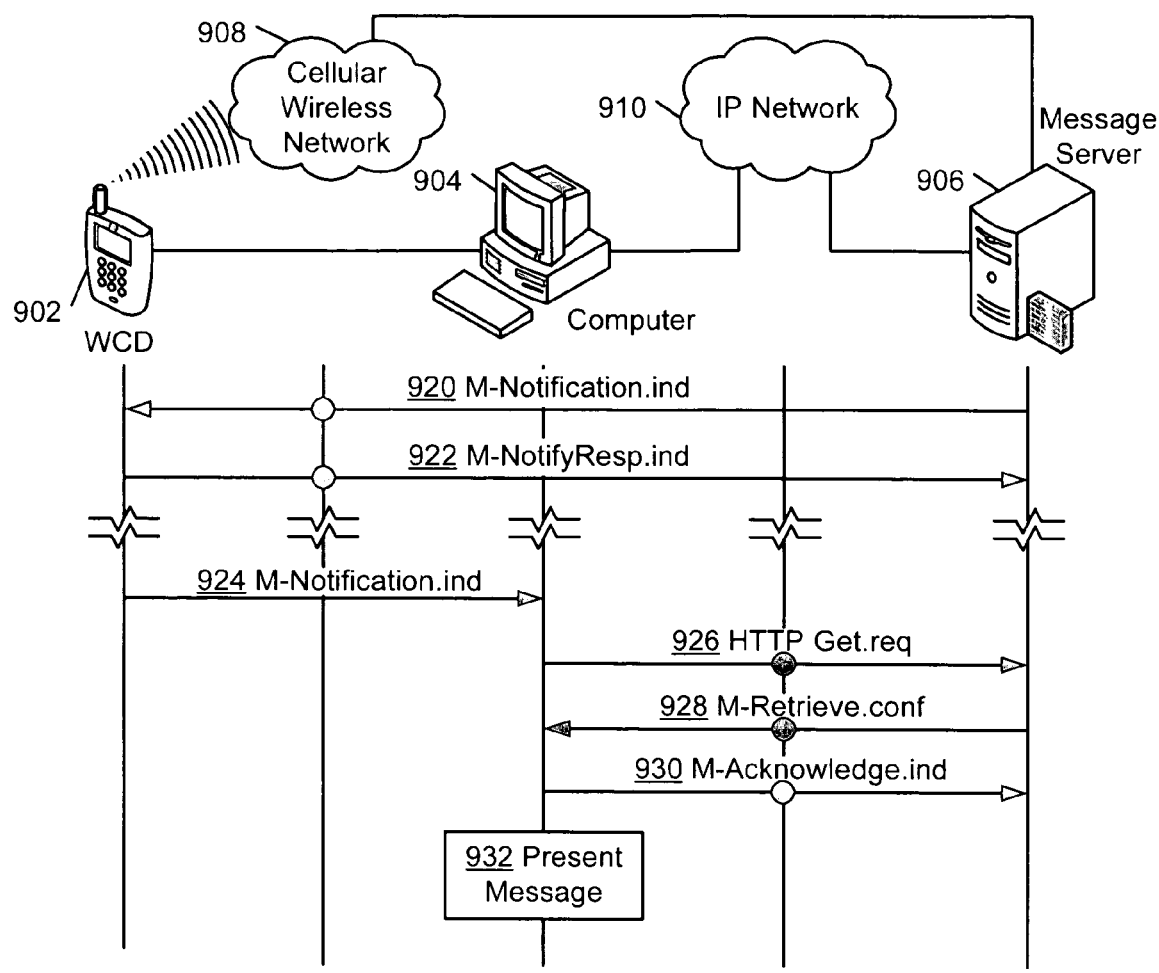
FIG. 9 is a second flow diagram showing an MMS signal sequence between elements of an embodiment.

FIG. 9 is another illustration of a process flow for delivering an MMS message. The process flow of FIG. 9 differs from that of FIG. 8 in at least two ways. First, in FIG. 9, a delay is present between being the time that a message-notification (M-Notification.ind) is received and the time of requesting that the MMS message being delivered. Second, in FIG. 9, the MMS message is presented at a local computer 904 rather than at a WCD 902. Although these variations of FIG. 8 occur on the same figure (FIG. 9), they are not linked—and thus may occur independent of one another.

The architecture in FIG. 9 is much like that of FIG. 8 with a wireless pathway interconnecting a message server 906 and the WCD 902 through a cellular wireless network 908. Likewise, FIG. 9 also shows a wired pathway connecting the message server 906 with the WCD 902 through an IP network 910 and a local computer 904.

At step 920, the message server 906 sends the M-Notification.ind to the WCD 902 over the cellular wireless network 908 for informing the WCD that an MMS message is available at the message server 906. Because the WCD 902 allows some time to pass before initiating a message request, at step 922, the WCD 902 sends an M-NotifyResp.ind to the message server 906 to inform the message server 906 that the M-Notification.ind was received.

After some time has passed, the WCD 902 sends a copy of or some indication of the M-Notification.ind to the local computer 904 at step 924. The M-Notification.ind is useful for informing the local computer 904 that an MMS message addressed to the WCD 902 is available at the message server 906. The local computer 904 then posts an HTTP Get.req to the message server 904 through the IP network 910 at step 926. The message server 906 sends the MMS message and an M-Retrieve.conf to the local computer 904 over the IP network 910 at step 928. In response to receiving the MMS message and M-Retrieve.conf, the local computer sends an M-Acknowledge.ind to the message server and renders the MMS message for output to a user at steps 930 and 932 respectively.

The delay between receiving notification of an MMS message and requesting the MMS message may be useful for a number of reasons. First, a human user may be otherwise occupied at the moment that the notification arrives—and thus unable to initiate a response (if initiation is required). Second, although the WCD 902 is shown connected to the local computer 904, this connection is not permanent. In fact, it is expected that the WCD 903 will often be "unplugged" from the local computer 904—e.g. when truly being used as a mobile phone. The connection may only be established for the purposes of recharging and synchronizing data on the WCD 902 and local computer 904. In one embodiment, a purpose of the delay in requesting the MMS message is to wait until the WCD 902 is connected with the local computer 904. Thus, according to a further embodiment, the retrieval steps (following the delay) are triggered when a data-synchronization is begun between the WCD 902 and the local computer 904. Data-synchronization may be triggered, for example, when the human user presses a data-synchronization button. Other reasons for the delay are also available.

c. Process Flow Showing Sender and Receiver

Figure 10:
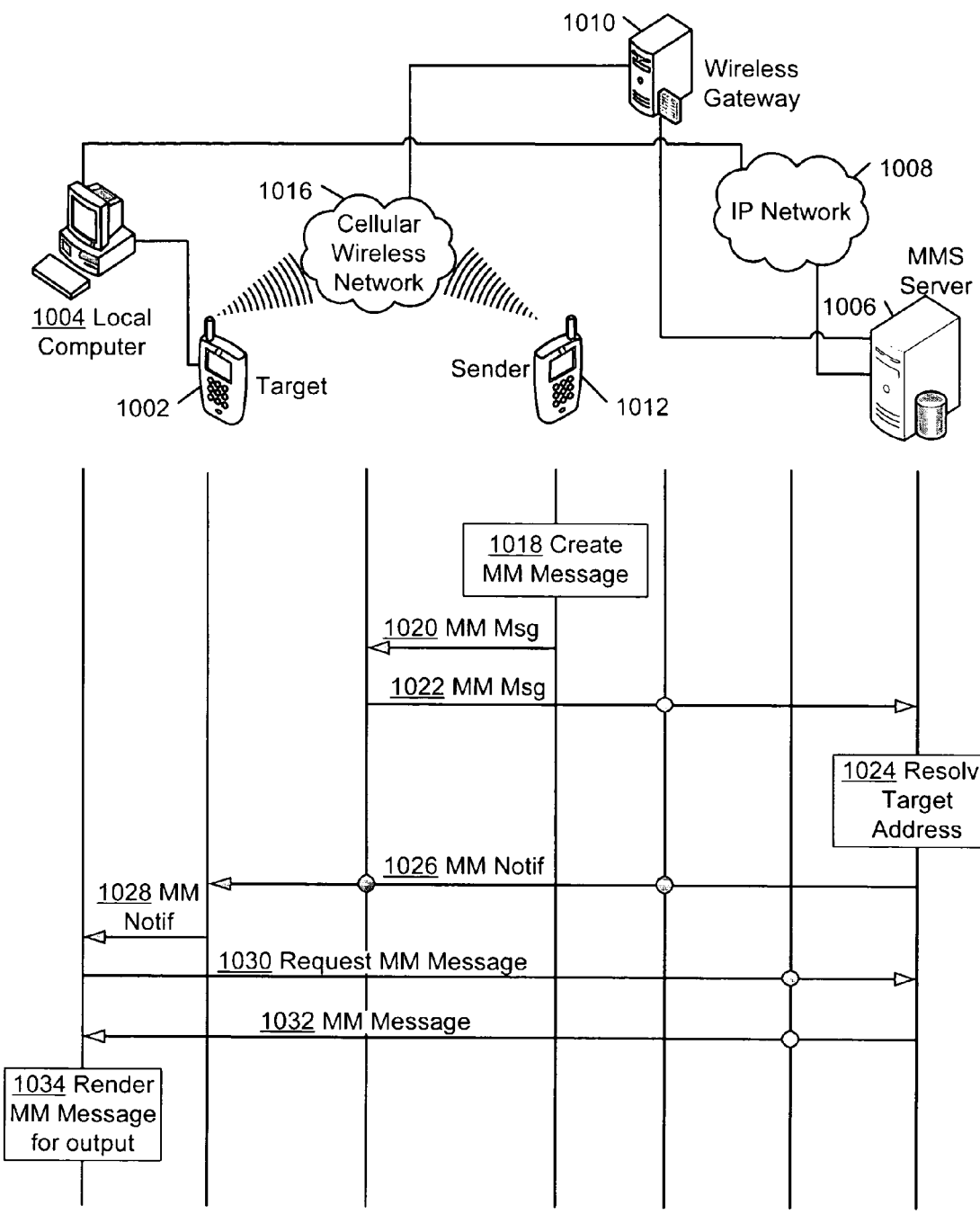
FIG. 10 is flow diagram showing an end-to-end signal sequence between elements of an embodiment.

The information flow of FIG. 10 is provided to further illustrate the functions and roles of the various system elements in the MMS framework. Generally, a multimedia message is sent from a sender 1012 to a target 1002. According to an embodiment, both the sender 1012 and target 1002 are cellular wireless communications devices—such as a cellular telephone. According to another embodiment, only the target 1002 is a wireless communications device.

As shown in FIG. 10, Both the sender 1012 and target 1002 can communicate with a cellular wireless network 1016 through an air interface such as CDMA, TDMA, or GSM. A wireless gateway 1010 serves as an intermediary between the cellular wireless network 1016 and an MMS server 1006. Those skilled in the art will understand that further intermediaries will exist such as a LAN or WAN. In a second pathway, the MMS server 1006 is connected with the target 1002 through an IP network 1008 and a local computer 1004. The local computer 1004 is locally connected with the target 1002.

According to an embodiment, at step 1018, an MMS message is created or edited at the sender 1012. The MMS message is sent from the sender 1012 to the cellular wireless network 1016 and forwarded on to the MMS server 1006 through the wireless gateway 1010 at steps 1020 and 1022 respectively. After receiving the MMS message, the MMS server resolves an address of the target to ensure proper delivery at step 1024. A multimedia message notification is sent over the cellular wireless network 1016 from the MMS server 1006 to the target 1002 at step 1026.

In order to receive the MMS message over a wired data path, the target 1002 forwards the multimedia message notification to the locally connected local computer 1004 at step 1028. The local computer 1004 then requests the multimedia message from the MMS server 1006 by sending a request message through the IP network 1008 on the wired data path at step 1030. In response to the message request, the MMS server 1006 sends the requested multimedia message to the local computer 1004 along a return path through the IP network 1008 at step 1032. At step 1034, the local computer renders the multimedia message for output on a terminal.

According to another embodiment, a process is described below concerning end-to-end MMS messaging between two terminals. The sending terminal is termed a user while the receiving terminal is termed a target. The user and target are both communication devices with MMS enabled functionality.

In another embodiment, a network architecture provides for end-to-end MMS messaging between a sending terminal (user) and a receiving terminal (target). Both the user and target are communication devices enabled with MMS client software for creating, sending, and receiving MMS messages. A process for sending an MMS message from the user to the target is described by the following steps:

1) The user activates a user MMS client. Preferably, the user MMS client is embodied by a set of program logic stored in data storage on the user and executable by a processor on the user.

2) The user selects or enters the target address.

3) The user composes or edits a message to be sent.

4) The user requests that the message be sent.

5) The MMS client on the user submits the message to a first MMS Proxy-relay that is associated with the user MMS client.

6) The first MMS Proxy-relay resolves the target address.

7) The first MMS Proxy-relay routes the message forward to a second MMS Proxy-relay that is associated with the target.

8) The message is stored by an MMS server that is associated with the second MMS Proxy-relay.

9) The second MMS Proxy-relay sends a notification to a target MMS client on the target to inform the target MMS client that a message is waiting at the MMS server associated with the target. Additionally, the notification contains a message key for identifying the message.

10) The target MMS client forwards the notification to a locally connected computer.

11) The locally connected computer retrieves the message from the MMS server using information from the notification such as the message key.

12) The locally connected computer forwards message to the target MMS client.

13) The target MMS client notifies the target of new message availability.

14) The target requests rendering of received message.

15) The target MMS client renders message on an associated terminal.

5. Exemplary Output at the Wireless Communications Device.

Figure 11:
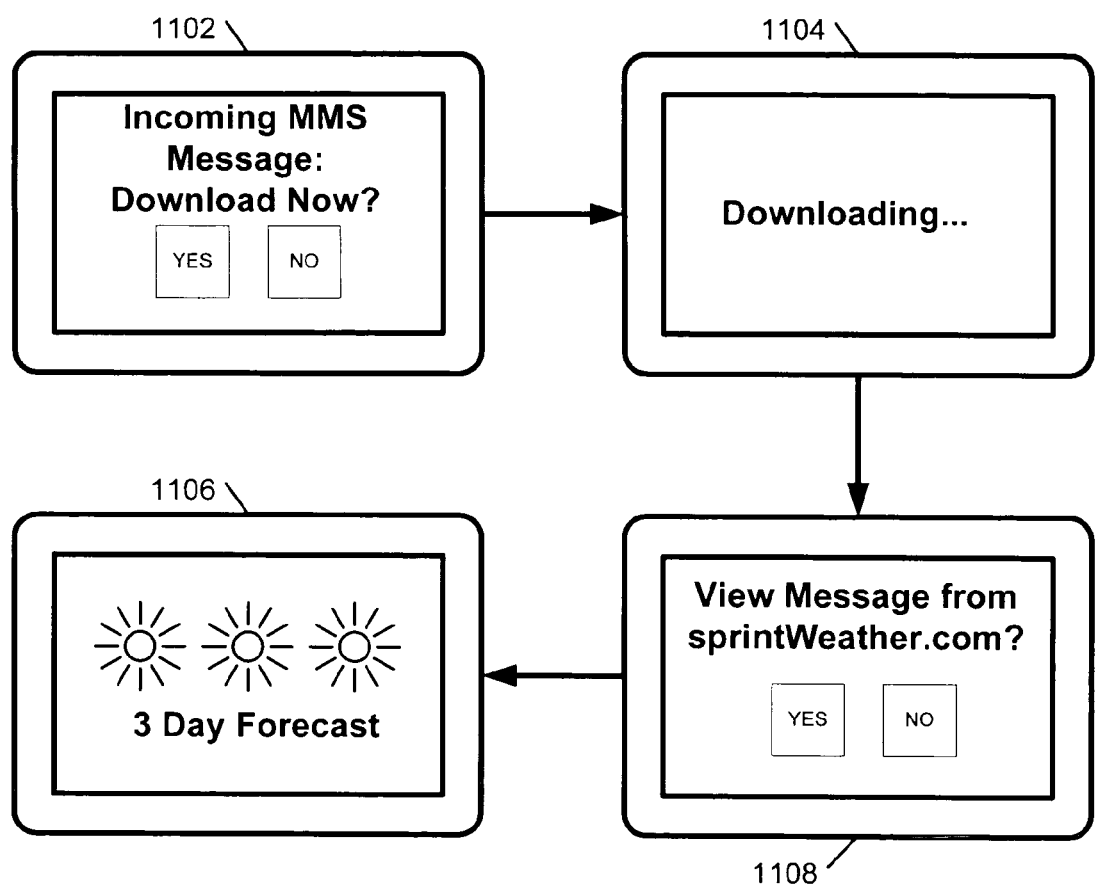
FIG. 11 is an example output of a sequence of screen shots on a wireless communications device.

An example output and user interface at the wireless communications device (WCD) is shown in FIG. 11. Specifically, FIG. 11 shows an output where the content is a weather forecast from a functional service known as sprintWeather.com. The four views shown represent a sequential output as seen by a human user who has requested or subscribed to receive a weather forecast. Views 1102 and 1106 represent user queries where the user is prompted for a response. According to other embodiments responses to these queries are predicted—thus eliminating the need for human interaction. View 1102 represents the output of a message-notification. As shown, a user is being notified that an MMS message is available for download. Yes/No boxes allow the user to respond with whether the MMS message should be requested. If the user selects "Yes" then the MMS message will be requested through a high-bandwidth pathway as indicated by the arrow from view 1102 to view 1104. View 1104 shows an "hourglass" display that may be seen by a user as an MMS message is being loaded. Once the MMS message is ready for output, the user may again be prompted for a response as to whether the output should be displayed as shown in view 1106 and indicated by the arrow directing the view path to view 1106 from view 1104. If the user selects "yes" in view 1106 then the content will be shown. This transition is shown by the arrow from view 1104 to view 1108. In view 1108, the MMS message is a weather forecast that is displayed. In this example, only visual output was shown. However, more generally, any combination of media such as audio, visual, and even vibratory may be used. This example output and user interface is given only as an illustration. User interfaces are well known in the art and can vary widely in form, format, media, as well as content.

5. CONCLUSION

A variety of embodiments have been described above. More generally, those skilled in the art will understand that changes and modifications may be made to these embodiments without departing from the true scope and spirit of the present invention, which is defined by the claims.

The invention claimed is:

1. A method comprising:

receiving a message-notification into a wireless communication device (WCD), via a cellular wireless air interface, the message-notification indicating a data message stored in a data network;

passing an indication of the message-notification from the WCD to a computer locally connected with the WCD;

responsively sending a message-retrieval request from the computer to a message server over a communication path that does not include the WCD and that does not include the cellular wireless air interface;

receiving the data message into the computer in a response to the message-retrieval request; and rendering the received data message for presentation to a user.

2. The method of claim 1, wherein the message-notification comprises a Multimedia-Message-Service (MMS) message-notification.

3. The method of claim 2, wherein the MMS message-notification comprises a coded Short Message Service (SMS) message.

4. The method of claim 1, wherein the data message comprises multimedia content selected from the group consisting of text, graphics, photographic image, audio, speech, and video.

5. The method of claim 1, wherein the WCD comprises a device selected from the group consisting of a cellular telephone, a wirelessly-equipped personal digital assistant (PDA), and a wirelessly-equipped personal computer.

6. The method of claim 1, wherein the cellular wireless air interface comprises an air interface selected from the group consisting of a CDMA air interface, a TDMA air interface and a GSM air interface.

7. The method of claim 1, wherein sending the message-retrieval request from the computer to a message server over the communication path that does not include the WCD and that does not include the cellular wireless air interface comprises:

sending the message-retrieval request from the computer to the message server over a network connection that includes a wired Ethernet link between the computer and a network router, and over a broadband connection between the network router and the message server.

8. The method of claim 1, wherein the message-retrieval request comprises a Hypertext Transport Protocol (HTTP) request.

9. The method of claim 1, wherein the indication of the message-notification comprises the message-notification.

10. A system comprising:

a wireless communication device (WCD) operable to communicate over a cellular wireless air interface with a cellular radio access network that provides connectivity with a packet-data network;

a computer connected locally to the WCD, the computer having a wired network connection with the packet-data network, the wired network collection not including the WCD and not including the cellular wireless air interface;

first message-client logic stored in the WCD and executable by the WCD, upon receipt of a message-notification via the cellular wireless air interface, to pass to the computer an indication of the message-notification, the message-notification indicating a data message stored in the packet-data network; and second message-client logic stored in the computer and executable by the computer, upon receipt of the indication, to send a message-retrieval request to a message-server on the packet-data network via the wired network connection, and to receive the data message in a response to the message-retrieval request.

11. The system of claim 10, wherein the second message-client logic is further executable by the computer to render the data message for presentation to a user.

12. The system of claim 10, wherein the second message-client logic is further executable to pass the data message to the WCD, and wherein the first message-client logic is further executable to render the data message for presentation to a user.

13. The system of claim 10, wherein the message-notification comprises a Multimedia-Message-Service (MMS) message-notification.

14. The system of claim 13, wherein the MMS message-notification comprises a coded Short Message Service (SMS) message.

15. The system of claim 10, wherein the data message comprises multimedia content selected from the group consisting of text, graphics, photographic image, audio, speech, and video.

16. The system of claim 10, wherein the WCD comprises a device selected from the group consisting of a cellular telephone, a wirelessly-equipped personal digital assistant (PDA), and a wirelessly-equipped personal computer.

17. The system of claim 10, wherein the cellular wireless air interface comprises an air interface selected from the group consisting of a CDMA air interface, a TDMA air interface and a GSM air interface.

18. The system of claim 10, wherein the wired network connection includes a wired Ethernet link between the computer and a network router, and a broadband connection between the network router and the packet-data network.

19. The system of claim 10, wherein the message-retrieval request comprises a Hypertext Transport Protocol (HTTP) request.

20. The system of claim 10, wherein the indication of the message-notification comprises the message-notification.

* * * * *

UNITED STATES PATENT AND TRADEMARK OFFICE
CERTIFICATE OF CORRECTION

| | |
|---|---|
| PATENT NO. | : 7,260,383 B1 |
| APPLICATION NO. | : 10/783158 |
| DATED | : August 21, 2007 |
| INVENTOR(S) | : John Ngan |

Page 1 of 1

It is certified that error appears in the above-identified patent and that said Letters Patent is hereby corrected as shown below:

Column 16, Line 1, please delete "collection" and add -- connection --.

Signed and Sealed this

Third Day of June, 2008

JON W. DUDAS
*Director of the United States Patent and Trademark Office*